(12) United States Patent
Baba et al.

(10) Patent No.: US 10,778,055 B2
(45) Date of Patent: Sep. 15, 2020

(54) ELECTRIC MOTOR, COMPRESSOR, AND REFRIGERATION AND AIR CONDITIONING APPARATUS

(71) Applicant: Mitsubishi Electric Corporation, Tokyo (JP)

(72) Inventors: Kazuhiko Baba, Tokyo (JP); Masahiro Nigo, Tokyo (JP); Kazuchika Tsuchida, Tokyo (JP); Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 16/064,033

(22) PCT Filed: Feb. 12, 2016

(86) PCT No.: PCT/JP2016/054107
§ 371 (c)(1),
(2) Date: Jun. 20, 2018

(87) PCT Pub. No.: WO2017/138142
PCT Pub. Date: Aug. 17, 2017

(65) Prior Publication Data
US 2019/0006896 A1  Jan. 3, 2019

(51) Int. Cl.
*H02K 1/27* (2006.01)
*H02K 11/33* (2016.01)
(Continued)

(52) U.S. Cl.
CPC ............ *H02K 1/278* (2013.01); *H02K 1/276* (2013.01); *H02K 1/2766* (2013.01); *H02K 5/24* (2013.01);
(Continued)

(58) Field of Classification Search
CPC ........ H02K 1/278; H02K 11/33; H02K 1/276; H02K 1/2766; H02K 5/24; H02K 5/225; H02K 2213/03; F25B 31/026
See application file for complete search history.

(56) References Cited

U.S. PATENT DOCUMENTS 7,768,172 B2 *  8/2010  Takahata ............. H02K 1/2766
                                          310/156.53
10,103,588 B2 * 10/2018  Baba ....................... F25B 1/005
(Continued)

FOREIGN PATENT DOCUMENTS

CN   103081300 A   5/2013
CN   104810946 A   7/2015
(Continued)

OTHER PUBLICATIONS

Office Action dated Aug. 6, 2019 issued in corresponding JP patent application No. 2017-566486 (and English translation).
(Continued)

*Primary Examiner* — Emily P Pham
(74) *Attorney, Agent, or Firm* — Posz Law Group, PLC

(57) ABSTRACT

In an electric motor, a first magnet and a second magnet are accommodated in magnet accommodating apertures of a rotor core. On outer circumferential core portions that exist on a radially outer side of the magnet accommodating apertures, two slits as a pair of first slits, and two slits that are respectively adjacent to each of the first slits are disposed circumferentially outside the pair of first slits as a pair of second slits. The outer circumferential core portions include: a first magnetic portion that exists between the pair of first slits; and a pair of second magnetic portions that respectively exist between the first slits and the second slits. An inter-magnet space portion that exists between the first magnet and the second magnet is positioned within a range
(Continued)

of the first magnetic portion in the circumferential direction of the rotor.

8 Claims, 6 Drawing Sheets

(51) Int. Cl.
  *H02K 5/24* (2006.01)
  *H02K 7/14* (2006.01)
  *H02K 5/22* (2006.01)
  *F25B 31/02* (2006.01)
(52) U.S. Cl.
  CPC ............ *H02K 11/33* (2016.01); *F25B 31/026* (2013.01); *H02K 5/225* (2013.01); *H02K 7/14* (2013.01); *H02K 2213/03* (2013.01)

(56) References Cited

U.S. PATENT DOCUMENTS

| | | | |
|---|---|---|---|
| 2008/0018190 A1 | 1/2008 | Takahata et al. | |
| 2009/0015081 A1* | 1/2009 | Takenaka | H02K 1/2766 310/54 |
| 2013/0140922 A1 | 6/2013 | Yabe et al. | |
| 2015/0194849 A1* | 7/2015 | Kayano | H02K 1/276 310/156.53 |
| 2015/0270752 A1* | 9/2015 | Tanaka | H02K 1/2766 310/156.56 |
| 2017/0310179 A1* | 10/2017 | Okouchi | H02K 1/2766 |

FOREIGN PATENT DOCUMENTS

| | | |
|---|---|---|
| JP | 2008-187778 A | 8/2008 |
| JP | 2009-106001 A | 5/2009 |
| JP | 2011-114927 A | 6/2011 |
| JP | 2012-172622 A | 9/2012 |
| JP | 2012-217249 A | 11/2012 |
| JP | 2015-116025 A | 6/2015 |
| JP | 2015-171272 A | 9/2015 |
| WO | 2012/026032 A1 | 3/2012 |

OTHER PUBLICATIONS

Office action dated May 7, 2019 issued in corresponding JP patent application No. 2017-566486 (and English translation thereof).
Office Action dated Jul. 30, 2019 issued in corresponding CN patent application No. 201680081110.2 (and English translation).
International Search Report of the International Searching Authority dated May 17, 2016 for the corresponding international application No. PCT/JP2016/054107 (and English translation).

* cited by examiner

ELECTRIC MOTOR, COMPRESSOR, AND REFRIGERATION AND AIR CONDITIONING APPARATUS

CROSS REFERENCE TO RELATED APPLICATION

This application is a U.S. national stage application of PCT/JP2016/054107 filed on Feb. 12, 2016, the contents of which are incorporated herein by reference.

TECHNICAL FIELD

The present invention relates to an electric motor that has a stator and a rotor that is disposed radially inside the stator, a compressor that includes the electric motor, and a refrigeration and air conditioning apparatus that includes the compressor.

BACKGROUND ART

Conventionally, electric motors are known in which permanent magnets are accommodated in magnet accommodating apertures of a rotor core, slits are disposed at two circumferential end portions of a peripheral core that exists radially outside the magnet accommodating apertures, and a certain area in the center of the magnetic pole portion of the peripheral core is formed only of a magnetic part that has no slits in order to reduce vibration and noise in the electric motor (see Patent Literature 1).

CITATION LIST

Patent Literature
[Patent Literature 1]
Japanese Patent Laid-Open No. 2012-217249 (Gazette)

SUMMARY OF THE INVENTION

Problem to be Solved by the Invention

In such conventional electric motors, large eddy currents arise in the permanent magnets since magnetic flux that is generated in the stator flows through the magnetic part of certain areas at the center of the magnetic pole portions so as to be concentrated at the surfaces of the permanent magnets. Thus, the temperature of the permanent magnets rises, giving rise to demagnetization of the permanent magnets.

The present invention aims to solve the above problems and an object of the present invention is to provide an electric motor, a compressor, and a refrigeration and air conditioning apparatus that can suppress demagnetization of permanent magnets while reducing vibration and noise.

Means for Solving the Problem

An electric motor according to the present invention includes: a stator; and a rotor that is disposed radially inside the stator, and that is rotatable relative to the stator; wherein: the rotor includes: a rotor core; and a plurality of permanent magnets that are disposed on the rotor core; magnet accommodating apertures that are equal in number to a number of magnetic poles in the rotor are disposed on the rotor core so as to be spaced apart from each other in a circumferential direction of the rotor; two of the permanent magnets are accommodated as a first magnet and a second magnet in each of the magnet accommodating apertures; the first magnet and the second magnet that are accommodated in the shared magnet accommodating apertures are disposed so as to be separated from each other in the circumferential direction of the rotor; the rotor core includes a plurality of outer circumferential core portions that respectively exist on a radially outer side of each of the magnet accommodating apertures; on each of the outer circumferential core portions; two slits that are adjacent to each other in the circumferential direction of the rotor are disposed at a circumferentially intermediate portion of the outer circumferential core portion as a pair of first slits, and two slits that are respectively adjacent to each of the first slits are disposed circumferentially outside the pair of first slits as a pair of second slits; the outer circumferential core portions include: a first magnetic portion that exists between the pair of first slits; and a pair of second magnetic portions that respectively exist between the first slits and the second slits that are adjacent to each other; and an inter-magnet space portion that exists between the first magnet and the second magnet is positioned within a range of the first magnetic portion in the circumferential direction of the rotor.

Effects of the Invention

According to the electric motor, the compressor, and the refrigeration and air conditioning apparatus according to the present invention, vibrational forces in a radial direction of the rotor can be reduced, enabling noise and vibration during operation to be suppressed. Heat generated in the permanent magnets can also be suppressed, enabling demagnetization of the permanent magnets to be suppressed.

DESCRIPTION OF EMBODIMENTS

Preferred embodiments of the present invention will now be explained with reference to the drawings.

Embodiment 1

Figure 1:
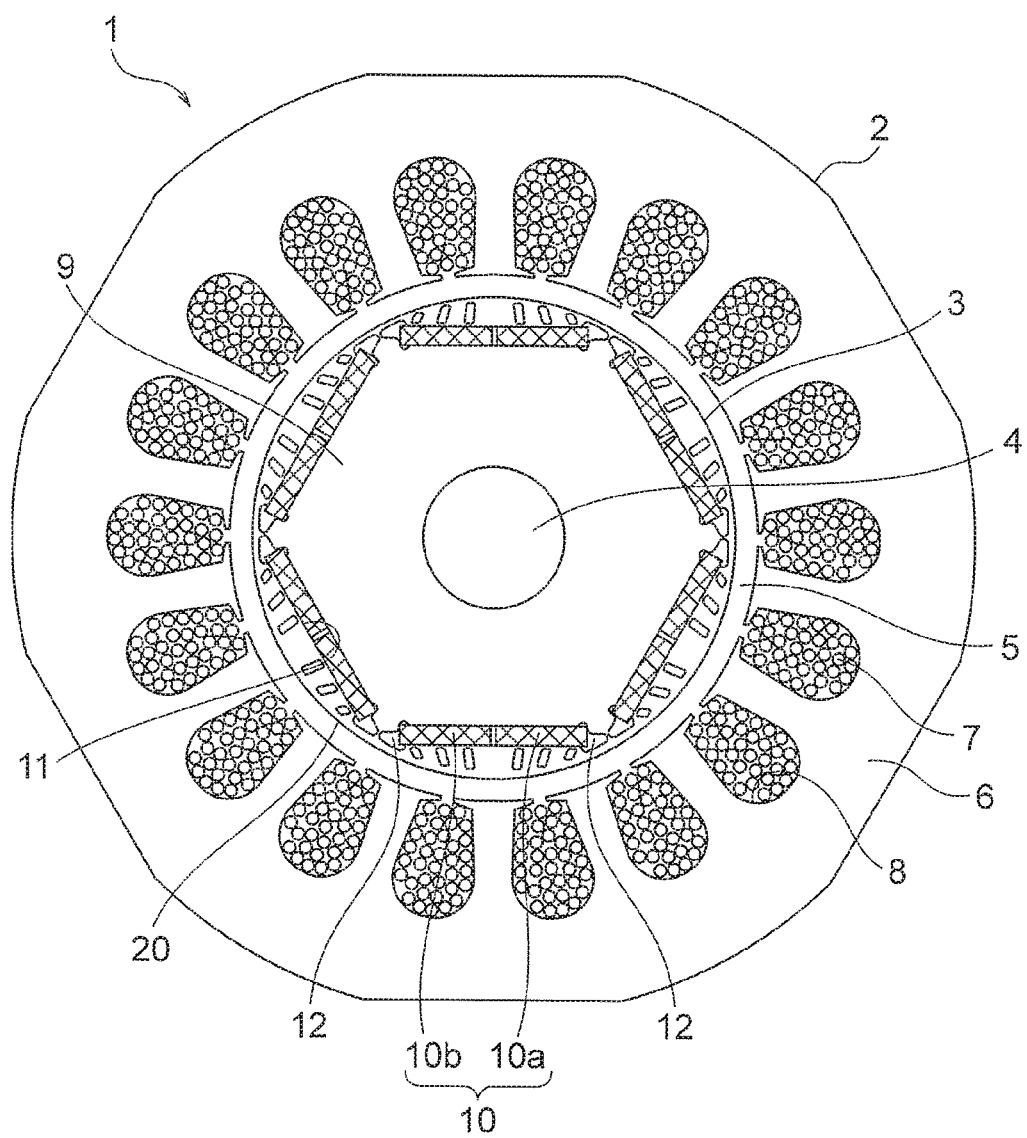
FIG. 1 is a cross section that shows an electric motor according to Embodiment 1 of the present invention.

FIG. 1 is a cross section that shows an electric motor according to Embodiment 1 of the present invention. In the figure, an electric motor 1 that is an embedded permanent magnet electric motor has: a tubular stator 2; a rotor 3 that is disposed radially inside the stator 2; and a rotating shaft 4 to which the rotor 3 is fixed. The stator 2, the rotor 3, and the rotating shaft 4 are disposed coaxially, so as to have a common axis. A gap 5 exists between an inner circumferential surface of the stator 2 and an outer circumferential surface of the rotor 3. Radial dimensions of the gap 5 are uniform around an entire circumference of the stator 2 and the rotor 3.

The stator 2 has: a tubular stator core 6; and coils 7 that are disposed on the stator core 6.

A plurality of slots 8 that are open on a radially inner side of the stator 2, i.e., toward the rotor 3 are disposed on an inner circumferential surface of the stator core 6 so as to be spaced apart from each other in a circumferential direction of the stator 2, In this example, the plurality of slots 8 are disposed on the inner circumferential surface of the stator core 6 at a uniform angular pitch.

The coils 7 are accommodated in each of the slots 8. In this example, the coils 7 are disposed on the stator core 6 as distributed windings. Moreover, the coils 7 may alternatively be disposed on the stator core 6 as concentrated windings. Electric current is supplied to the coils 7 by pulse-width modulation (PWM) control using an inverter. Rotating magnetic fields are generated in the stator 2 by supplying the electric current to the coils 7.

The rotor 3 is rotatable relative to the stator 2 around the axis of the rotor 3. The rotor 3 has: a rotor core 9 that is fixed to the rotating shaft 4; and a plurality of permanent magnets 10 that are disposed on the rotor core 9. A plurality of magnetic poles are formed on the rotor 3 by the respective permanent magnets 10. The plurality of magnetic poles that are formed on the rotor 3 exist at regular intervals in a circumferential direction of the rotor 3. In this example, the number of magnetic poles on the rotor 3 is six.

The rotor core 9 is configured using a magnetic material. The rotor core 9 is a cylindrical laminated body in which a plurality of configured plates are laminated in an axial direction of the rotor 3. Silicon steel plates that are formed by punching using a die, for example, are used as the configured plates. A shaft through-hole that is parallel to the shaft axis of the rotor 3 is disposed centrally on the rotor core 9. The rotating shaft 4 is fixed to the rotor core 9 so as to be fitted into the shaft through-hole by shrinkage fitting or press-fitting, for example. The rotor 3 is rotated around the axis of the rotor 3 together with the rotating shaft 4 by the rotating magnetic fields that are generated in the stator 2.

Magnet accommodating apertures 11 that are equal in number to the number of magnetic poles on the rotor 3 are disposed on the rotor core 9 so as to be spaced apart from each other in the circumferential direction of the rotor 3. In this example, six magnet accommodating apertures 11 are disposed on the rotor core 9 at a uniform angular pitch in the circumferential direction of the rotor 3. Each of the magnet accommodating apertures 11 is formed so as to be parallel to the shaft axis of the rotor 3. The plurality of magnetic poles on the rotor 3 are formed on the rotor 3 so as to match the circumferential positions of each of the magnet accommodating apertures 11. Two permanent magnets 10 are accommodated in each of the magnet accommodating apertures 11. That is, pairs of permanent magnets 10 are accommodated in shared magnet accommodating apertures 11 as first magnets 10a and second magnets 10b. Shared magnetic poles are formed on the rotor 3 by the first magnets 10a and second magnets 10b that are accommodated in the shared magnet accommodating apertures 11.

Figure 2:
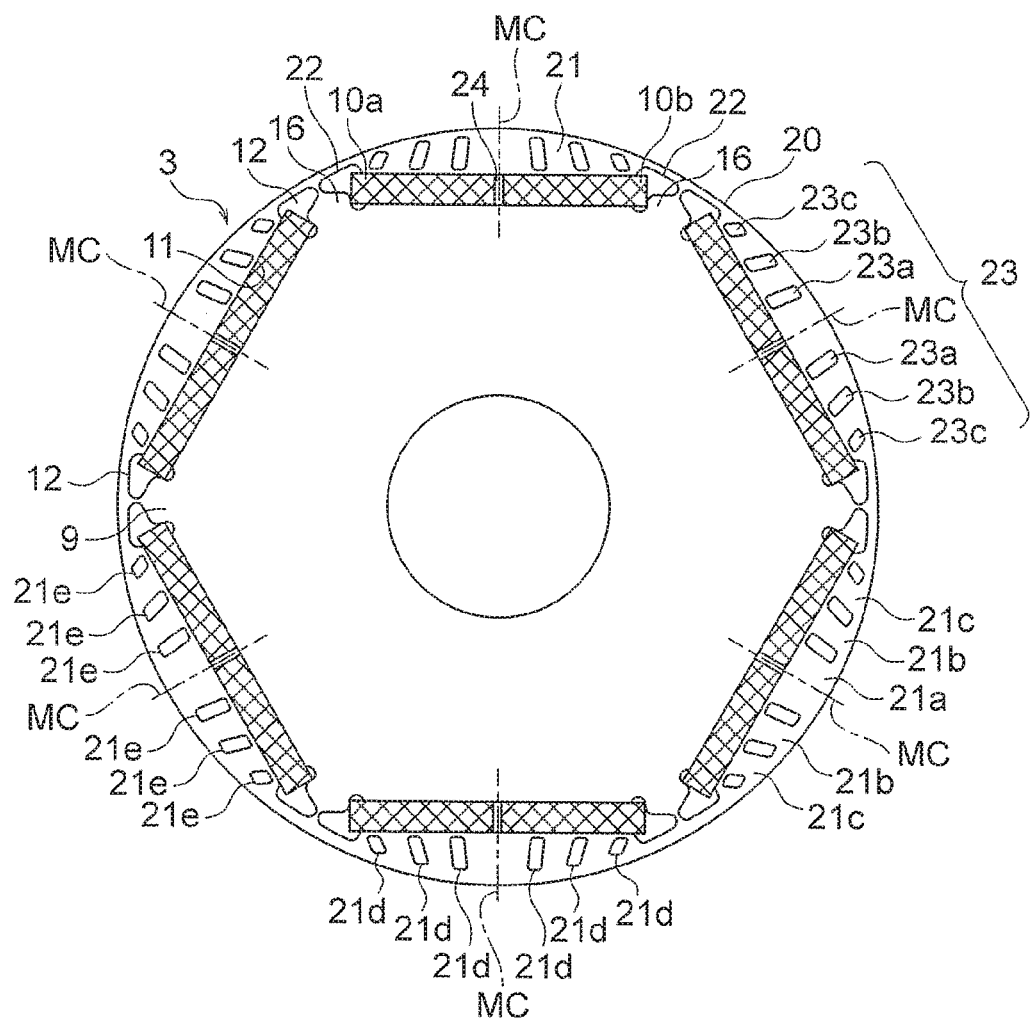
FIG. 2 is a cross section that shows a rotor from FIG. 1.
Figure 3:
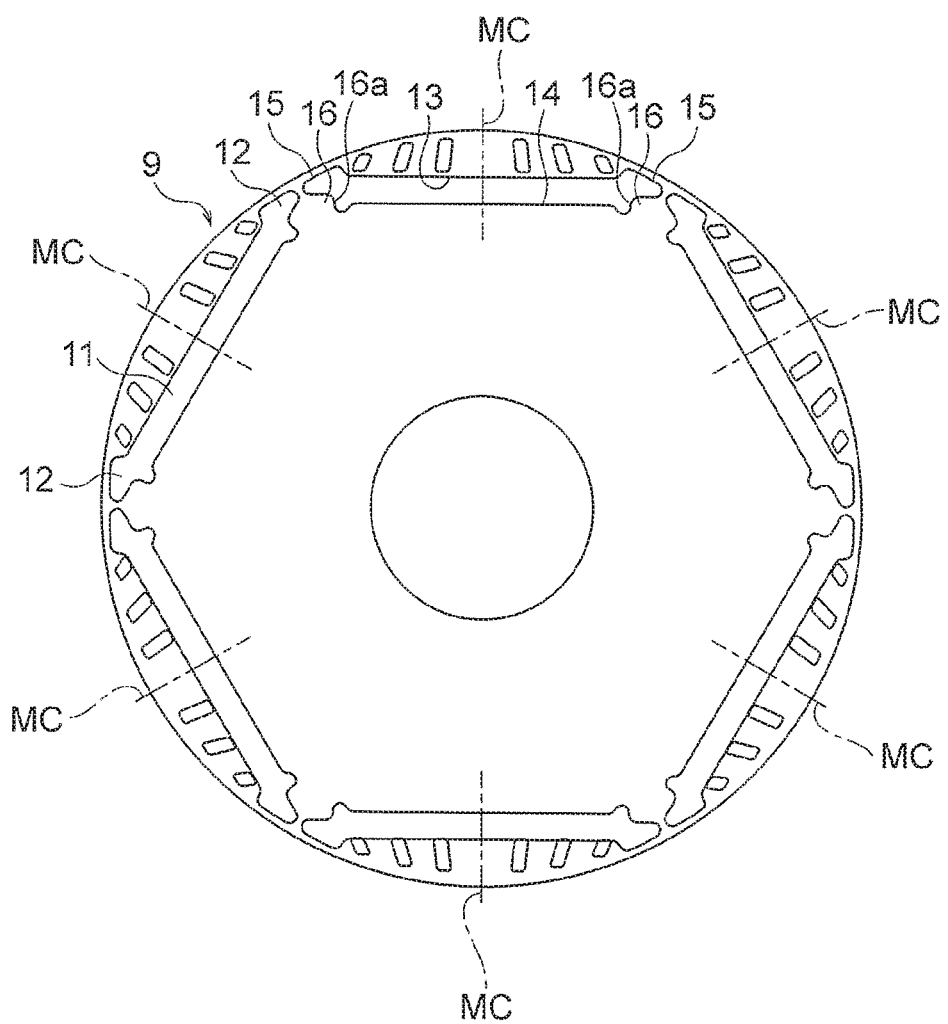
FIG. 3 is a cross section that shows a rotor core from FIG. 2.

FIG. 2 is a cross section that shows a rotor 3 from FIG. 1. FIG. 3 is a cross section that shows a rotor core 9 from FIG. 2, The shapes of all of the magnet accommodating apertures 11 are identical. The positions of all of the magnet accommodating apertures 11 in the radial direction of the rotor 3 are also identical. In addition, each of the magnet accommodating apertures 11 extends over an equal angular range in the circumferential direction of the rotor 3. The shapes of the magnet accommodating apertures 11 when viewed along the shaft axis of the rotor 3 are flat shapes in which a dimension in the radial direction of the rotor 3 (a radial dimension) is smaller than a dimension in the circumferential direction of the rotor 3 (a circumferential dimension). The shapes of the magnet accommodating apertures 11 are symmetrical relative to magnetic pole center lines MC, which are a straight radial lines that pass through the centers of the magnetic poles when viewed along the shaft axis of the rotor 3.

A plurality of flux barriers 12 that constitute spaces that communicate inside the magnet accommodating apertures 11 at two circumferential end portions of each of the magnet accommodating apertures 11 are disposed on the rotor core 9. A pair of flux barriers 12 communicate within each shared magnet accommodating aperture 11. Each of the flux barriers 12 is positioned between two mutually adjacent magnetic poles of the rotor 3. Each of the flux barriers 12 bulges toward an outer circumferential surface 20 of the rotor core 9 from the magnet accommodating aperture 11 when viewed along the shaft axis of the rotor 3. Magnetic leakage flux between the mutually adjacent magnetic poles in the rotor 3 is reduced by the flux barriers 12.

As shown in FIG. 3, outlines of the magnet accommodating apertures 11 when viewed along the shaft axis of the rotor 3 have an outside delimiting line 13 and an inside delimiting line 14. The inside delimiting line 14 is positioned radially further inward than the outside delimiting line 13. In this example, intermediate portions of both the outside delimiting line 13 and the inside delimiting line 14 are straight lines that are perpendicular to the magnetic pole center lines MC when viewed along the shaft axis of the rotor 3. Outlines of each of the flux barriers 12 form end lines 15 that join together respective end portions of the outside delimiting line 13 and the inside delimiting line 14 when viewed along the shaft axis of the rotor 3.

Portions of the rotor core 9 on a radially inner side of each of the flux barriers 12 bulge as protruding portions 16 in a direction that makes spaces between the magnet accommodating apertures 11 and the flux barriers 12 narrower. Each of the protruding portions 16 has a positioning function that prevents the first magnets 10a and the second magnets 10b that are accommodated in the magnet accommodating apertures 11 from being displaced in the circumferential direction of the rotor 3.

A dimension that enables side surfaces 16a of the protruding portions 16 to come into surface contact with circumferential end surfaces of the permanent magnets 10 is ensured as a height of each of the protruding portions 16. A dimension that can prevent displacement of the permanent magnets 10 is ensured as a dimension of the surface contacting portion of each of the protruding portions 16. In this example, the height of each of the protruding portions 16 is 0.5 mm.

As shown in FIG. 2, the rotor core 9 has: a plurality of outer circumferential core portions 21 that respectively exist on a radially outer side of each of the magnet accommodating apertures 11; and a plurality of outer circumferential thin portions 22 that respectively exist on a radially outer side of each of the flux barriers 12. The outer circumferential core portions 21 are formed between the outer circumferential surface 20 of the rotor core 9 and the outside delimiting lines 13 of the magnet accommodating apertures 11. The outer circumferential thin portions 22 are formed between the outer circumferential surface 20 of the rotor core 9 and the end lines 15 of the flux barriers 12. The outer circumferential thin portions 22 are connected to each of two circumferential end portions of the outer circumferential core portions 21, A radial wall thickness of the outer circumferential thin portions 22 is thinner than a radial wall thickness of the outer circumferential core portions 21.

A plurality of slits 23 are disposed on each of the outer circumferential core portions 21 so as to be separated from each other in the circumferential direction of the rotor 3. In this example six slits 23 are respectively disposed on each of the outer circumferential core portions 21. That is, six slits 23 are disposed for each single magnetic pole in the rotor 3. There are no opening portions that connect to the magnet accommodating apertures 11 or to the outer circumferential surface 20 of the rotor core 9 in each of the slits 23, shapes of each of the slits 23 being enclosed inside the outer circumferential core portions 21.

On each of the outer circumferential core portions 21, two slits 23 that are adjacent to each other in the circumferential direction of the rotor 3 are disposed at a circumferentially intermediate portion of the outer circumferential core portion 21 as a pair of first slits 23a, two slits 23 that are respectively adjacent to each of the first slits 23a circumferentially outside the pair of first slits 23a are disposed as a pair of second slits 23b, and two slits 23 that are respectively adjacent to each of the second slits 23b circumferentially outside the pair of second slits 23b are disposed as a pair of third slits 23c.

When the outer circumferential core portions 21 are viewed in the direction of the shaft axis of the rotor 3, the pair of first slits 23a exist at positions that are on opposite sides of the magnetic pole center lines MC in the circumferential direction of the rotor 3. Consequently, in each of the outer circumferential core portions 21, one each of the first slits 23a, the second slits 23b, and the third slits 23c exist on two circumferential sides of the magnetic pole center lines MC. In this example, respective positions of the pair of first slits 23a, the pair of second slits 23b, and the pair of third slits 23c are positions that are symmetrical relative to the magnetic pole center lines MC when viewed along the shaft axis of the rotor 3.

The first slits 23a, the second slits 23b, and the third slits 23c in each of the outer circumferential core portions 21 respectively extend toward the outer circumferential surface 20 of the rotor core 9 from a vicinity of the magnet accommodating apertures 11. When the outer circumferential core portions 21 are viewed in the direction of the shaft axis of the rotor 3, the first slits 23a, the second slits 23b, and the third slits 23c in each of the outer circumferential core portions 21 are respectively inclined relative to the magnetic pole center lines MC toward the magnetic pole center lines MC in an outward radial direction of the rotor 3. In addition, lengths of the slits 23 become shorter as the distance increases away from the magnetic pole center lines MC when viewed along the shaft axis of the rotor 3. That is, when the slits 23 are viewed in the direction of the shaft axis of the rotor 3, lengths of the first slits 23a, which are nearest to the magnetic pole center lines MC, are longest, and lengths of the second slits 23b and the third slits 23c are sequentially shorter, lengths of the third slits 23c, which are farthest away from the magnetic pole center lines MC, being shortest.

Each of the outer circumferential core portions 21 has: a first magnetic portion 21a that exists between the pair of first slits 23a; a pair of second magnetic portions 21b that respectively exist between the first slits 23a and the second slits 23b; a pair of third magnetic portions 21c that respectively exist between the second slits 23b and the third slits 23c; a plurality of thin outside magnetic portions 21d that exist between the outer circumferential surface 20 of the rotor 3 and each of the first slits 23a, the second slits 23b, and the third slits 23c; and a plurality of thin inside magnetic portions 21e that exist between the outside delimiting line 13 of the magnet accommodating apertures 11 and each of the first slits 23a, the second slits 23b, and the third slits 23c.

The first magnetic portion 21a, the second magnetic portions 21b, the third magnetic portions 21c, the outside magnetic portions 21d, and the inside magnetic portions 21e form a magnetic portion that is constituted only by magnetic material where there are no slits (i.e., spaces).

Radial wall thicknesses of both the plurality of outside magnetic portions 21d and the plurality of inside magnetic portions 21e are approximately equal to a sheet thickness of the configured plates that constitute the rotor core 9. The radial wall thicknesses of both the outside magnetic portions 21d and the inside magnetic portions 21e are approximately 0.2 mm through 0.5 mm, for example.

Figure 4:
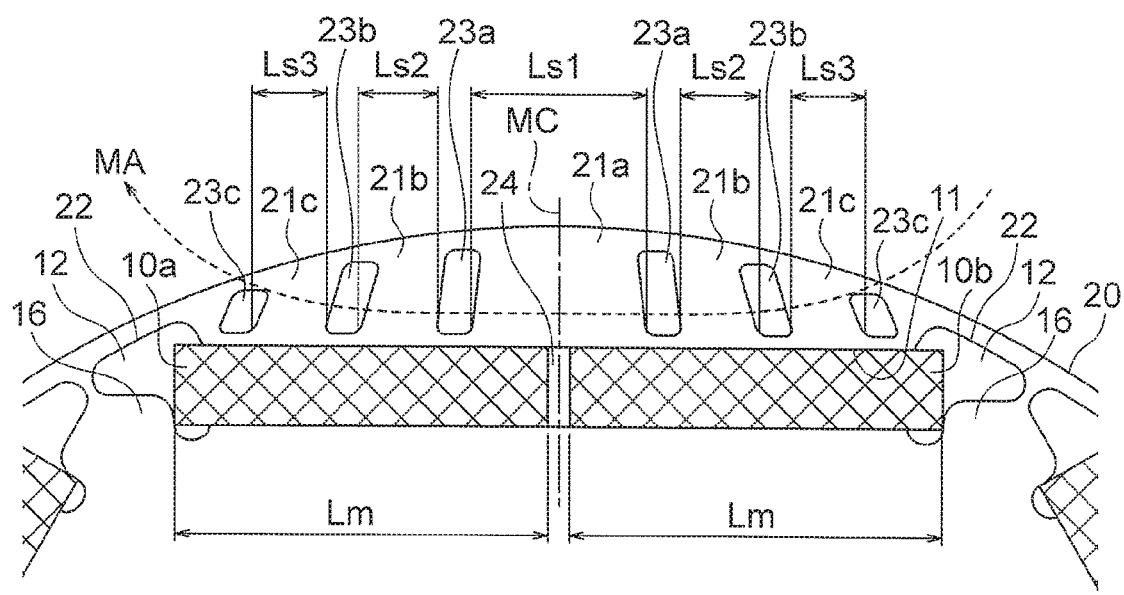
FIG. 4 is an enlargement that shows an outer circumferential core portion from FIG. 2.

FIG. 4 is an enlargement that shows an outer circumferential core portion 21 from FIG. 2. A dimension Ls1 of the first magnetic portion 21a in the circumferential direction of the rotor 3 is greater than both a dimension Ls2 of the second magnetic portions 21b and a dimension Ls3 of the third magnetic portions 21c in the circumferential direction of the rotor 3. The dimension Ls2 of the second magnetic portions 21b in the circumferential direction of the rotor 3 is equal to the dimension Ls3 of the third magnetic portions 21c in the circumferential direction of the rotor 3 (Ls1>Ls2=Ls3). Here, the dimensions Ls1, Ls2, and Ls3 are dimensions that are based on the radially inner end portions of the first magnetic portion 21a, the second magnetic portions 21b, and the third magnetic portions 21c, respectively. The size relationships among the respective dimensions Ls1, Ls2, and Ls3 of the first magnetic portion 21a, the second magnetic portions 21b, and the third magnetic portions 21c are identical, i.e., Ls1>Ls2=Ls3, irrespective of which position in the radial direction of the rotor 3 is used as a basis.

The first magnets 10a and the second magnets 10b are tabular permanent magnets that have identical shapes and identical sizes. The first magnets 10a and the second magnets 10b that are accommodated in the shared magnet accommodating apertures 11 are disposed such that an identical polarity, either a South-seeking (S) pole or a North-seeking (N) pole, faces toward the radially outer side of the rotor 3. In pairs of magnet accommodating apertures 11 that are adjacent to each other in the circumferential direction of the rotor 3, the first and second magnets 10a and 10b that are accommodated in first magnet accommodating apertures 11 and the first and second magnets 10a and 10b that are accommodated in second magnet accommodating apertures 11 are disposed such that mutually different polarities face radially outward. Magnetic poles are thereby formed in the rotor 3 that alternate between S poles and the N poles in each magnet accommodating aperture 11 in the circumferential direction of the rotor 3. Neodymium-iron-boron (MB) rare-earth magnets, for example, can be used as the permanent magnets 10.

The first magnets 10a and the second magnets 10b that are accommodated in the shared magnet accommodating apertures 11 are disposed so as to line up on straight lines that are perpendicular to the magnetic pole center lines MC. The respective dimensions Lm of the first magnets 10a and the second magnets 10b in the circumferential direction of the rotor 3 are greater than the dimension Ls1 of the first magnetic portion 21a in the circumferential direction of the rotor 3 (Lm>Ls1). Specifically, the relationship between the respective dimensions Lm of the first magnets 10a and the second magnets 10b and the dimension Ls1 of the first magnetic portion 21a satisfies Expression (1) below.

$$1.5\ Ls1 \leq Lm \leq 2.5\ Ls1 \tag{1}$$

End portions of the first magnets 10a on an interpolar side are exposed inside a first flux barrier 12, and end portions of the second magnets 10b on an interpolar side are exposed inside a second flux barrier 12.

The first magnets 10a and the second magnets 10b that are accommodated in the shared magnet accommodating apertures 11 are disposed so as to be separated from each other in the circumferential direction of the rotor 3. Inter-magnet space portions 24 thereby exist between the first magnets 10a and the second magnets 10b. The inter-magnet space portions 24 are positioned within a range of the first magnetic portions 21a in the circumferential direction of the rotor 3. In other words, the inter-magnet space portions 24 face the first magnetic portions 21a in the radial direction of the rotor 3. The positions of the inter-magnet space portions 24 when viewed along the shaft axis of the rotor 3 are positions through which the magnetic pole center lines MC pass. In addition, the dimensions of the inter-magnet space portions 24 in the circumferential direction of the rotor 3 are smaller than respective width dimensions of the slits 23, where a width dimension of the slits 23 is a dimension of the slits 23 in a width direction that is perpendicular to longitudinal axes of the slits 23 when viewed in the direction of the shaft axis of the rotor 3.

In an electric motor 1 of this kind, because not only pairs of first slits 23a that are adjacent to each other at circumferentially intermediate portions of the outer circumferential core portions 21 of the rotor core 9, but also pairs of second slits 23b that are adjacent to each of the first slits 23a circumferentially outside the pairs of first slits 23a are disposed on the outer circumferential core portions 21, flow of stator reactive magnetic flux MA such as that shown in FIG. 4 that moves in an approximately circumferential direction from the stator 2, from which there is a risk of giving rise to noise and vibration, can be more reliably suppressed by the first slits 23a and the second slits 23b, The distribution of magnetic flux in the outer circumferential core portions 21 can also be adjusted in the circumferential direction of the rotor 3 by adjusting the positions of the second slits 23b relative to the first slits 23a. Vibrational forces in the radial direction of the rotor 3 can thereby be reduced, enabling noise and vibration during the operation of the electric motor 1 to be suppressed.

Because the first magnets 10a and second magnets 10b that constitute pairs of permanent magnets 10 that are accommodated in the shared magnet accommodating apertures 11 are disposed so as to be separated from each other in the circumferential direction of the rotor 3, and inter-magnet space portions 24 that exist between the first magnets 10a and the second magnets 10b are positioned within a range of the first magnetic portions 21a in the circumferential direction of the rotor 3, electrical insulation performance between the first magnets 10a and the second magnets 10b can be more reliably ensured. Thus, even if magnetic flux from the stator 2 flows through the first magnetic portion 21a and is concentrated at the respective surfaces of the first magnets 10a and second magnets 10b, eddy currents can be prevented from flowing between the first magnets 10a and the second magnets 10b, enabling eddy current loss in the first magnets 10a and the second magnets 10b to be reduced. Particularly when the electric motor 1 is operated in a voltage saturation region in which the voltage that is supplied to the electric motor 1 from the inverters is a maximum voltage that the inverters can supply, that is, during high-output operation of the electric motor 1, demagnetizing fields act on the rotor 3, and eddy current loss in the permanent magnets 10 is more likely to increase, but even in that case, eddy currents can be prevented from flowing between the first magnets 10a and the second magnets 10b, enabling eddy current loss in the first magnets 10a and the second magnets 10b to be reduced. Heat generated in the permanent magnets 10 can thereby be suppressed, enabling demagnetization of the permanent magnets 10 to be suppressed. Because demagnetization of the permanent magnets 10 can be suppressed, the quantity of dysprosium (Dy) added to the permanent magnets 10 in order to increase the coercivity of the permanent magnets can be reduced, also enabling reductions in cost of the electric motor 1 to be achieved.

Because the dimension Ls1 of the first magnetic portion 21a in the circumferential direction of the rotor 3 is greater than the dimension Ls2 of the second magnetic portions 21b in the circumferential direction of the rotor 3, a large amount of magnetic flux can be allowed to pass through portions near centers of the magnetic poles, enabling the rotational torque of the electric motor 1 to be improved.

Because the first slits 23a, the second slits 23b, and the third slits 23c in each of the outer circumferential core portions 21 are respectively inclined relative to the magnetic pole center lines MC toward the magnetic pole center lines MC in an outward radial direction of the rotor 3, the magnetic flux of each of the first magnets 10a and the second magnets 10b can be concentrated toward the magnetic pole center lines MC. Improvements in rotational torque of the electric motor 1 are thereby further enabled.

Because the respective dimensions Lm of the first magnets 10a and the second magnets 10b in the circumferential direction of the rotor 3 are greater than the dimension Ls1 of the first magnetic portion 21a in the circumferential direction of the rotor 3, the range of the first magnets 10a and second magnets 10b can be ensured even circumferentially outside the pairs of first slits 23a, enabling the positions of the pairs of second slits 23b to be easily adjusted. The distribution of magnetic flux from the first magnets 10a and the second magnets 10b can thereby be adjusted easily.

Because the dimensions of the inter-magnet space portions 24 in the circumferential direction of the rotor 3 are smaller than respective width dimensions of the slits 23, respective volumes of the first magnets 10a and second magnets 10b inside the magnet accommodating apertures 11 can be ensured while ensuring electrical insulation performance between the first magnets 10a and the second magnets 10b.

Because the respective sizes and shapes of the first magnets 10a and second magnets 10b are identical, costs incurred on the permanent magnets 10, of which a large number are installed, can be reduced.

Because pairs of flux barriers 12 that constitute spaces that communicate with shared magnet accommodating apertures 11 at two circumferential end portions of each of the magnet accommodating apertures 11 are disposed on the rotor core 9, and outer circumferential thin portions 22 that are thinner than the outer circumferential core portions 21 exist radially outside the flux barriers 12, demagnetizing fields that act on the rotor 3 can be easily released, enabling magnetic flux that interlinks with portions of the permanent magnets 10 near the inter-magnet space portions 24 to be reduced. Eddy currents that arise in the permanent magnets 10 can thereby be further reduced, enabling demagnetization of the permanent magnets 10 to be further suppressed.

Embodiment 2

Figure 5:
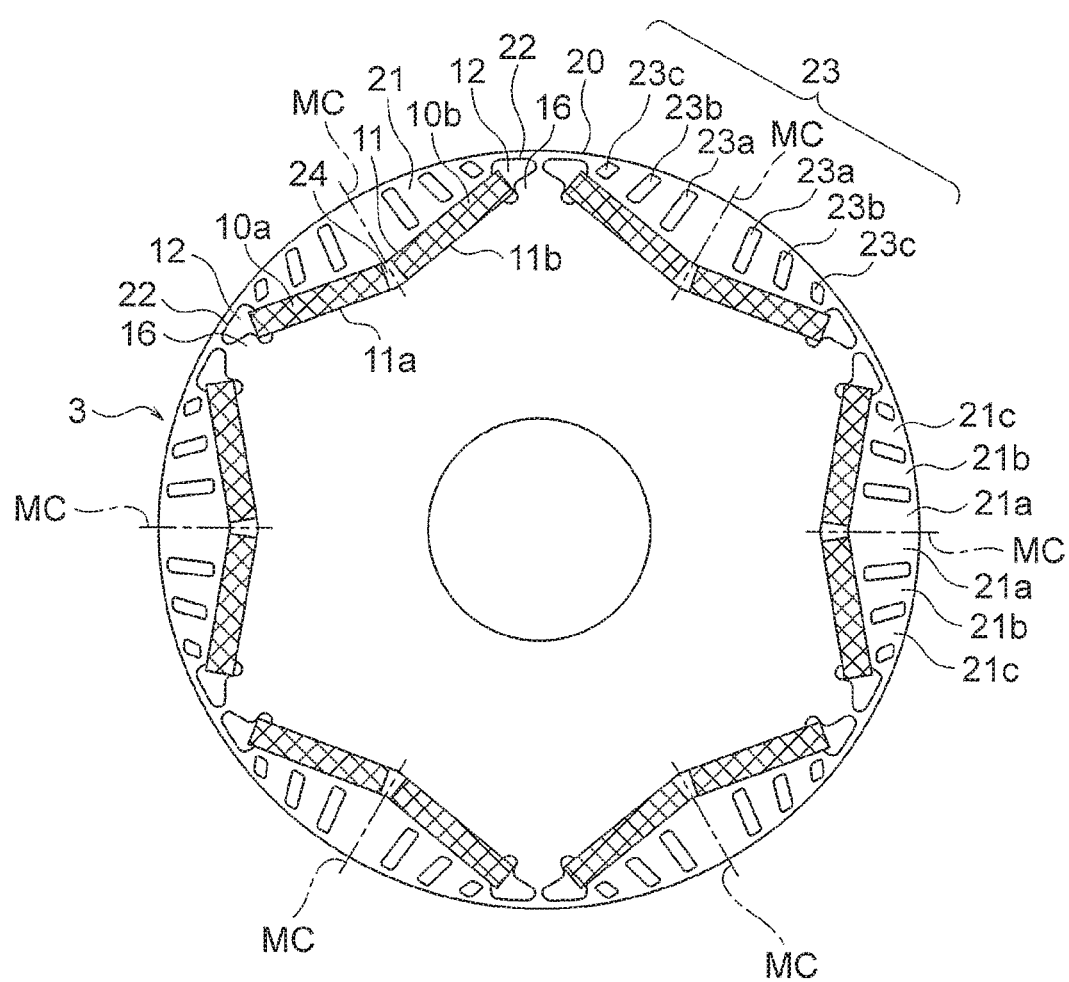
FIG. 5 is a cross section that shows a rotor of an electric motor according to Embodiment 2 of the present invention.

FIG. 5 is a cross section that shows a rotor of an electric motor according to Embodiment 2 of the present invention. Magnet accommodating apertures 11 have first accommodating portions 11a and second accommodating portions 11b that communicate with each other in a circumferential direction of a rotor 3. First flux barriers 12 communicate with the first accommodating portions 11a, and second flux barriers 12 communicate with the second accommodating portions 11b. The first accommodating portions 11a and second accommodating portions 11b in shared magnet accommodating apertures 11 are inclined relative to magnetic pole center lines MC so as to approach a shaft axis of the rotor 3 toward the magnetic pole center lines MC when viewed along the shaft axis of the rotor 3. Thus, the shapes of the magnet accommodating apertures 11 when viewed along the shaft axis of the rotor 3 are V shapes that protrude inward in a radial direction of the rotor 3 from two circumferential end portions of the magnet accommodating apertures 11 toward the magnetic pole center lines MC. The shapes of the magnet accommodating apertures 11 are symmetrical relative to the magnetic pole center lines MC when viewed along the shaft axis of the rotor 3.

First magnets 10a are accommodated in the first accommodating portions 11a, and second magnets 10b are accommodated in the second accommodating portions 11b. Circumferential dimensions of inter-magnet space portions 24 that exist between the first magnets 11a and the second magnets 11b thereby become continuously larger from a radially outer side of the rotor 3 toward a radially inner side. A remainder of the configuration is similar or identical to that of Embodiment 1.

Even if the shapes of the magnet accommodating apertures 11 when viewed along the shaft axis of the rotor 3 are made into V shapes in this manner, magnetic flux that is produced by the coils 7 of the stator 2 can be suppressed from interlinking with the permanent magnets 10, enabling eddy current loss in the first magnets 10a and the second magnets 10b to be further reduced.

Embodiment 3

Figure 6:
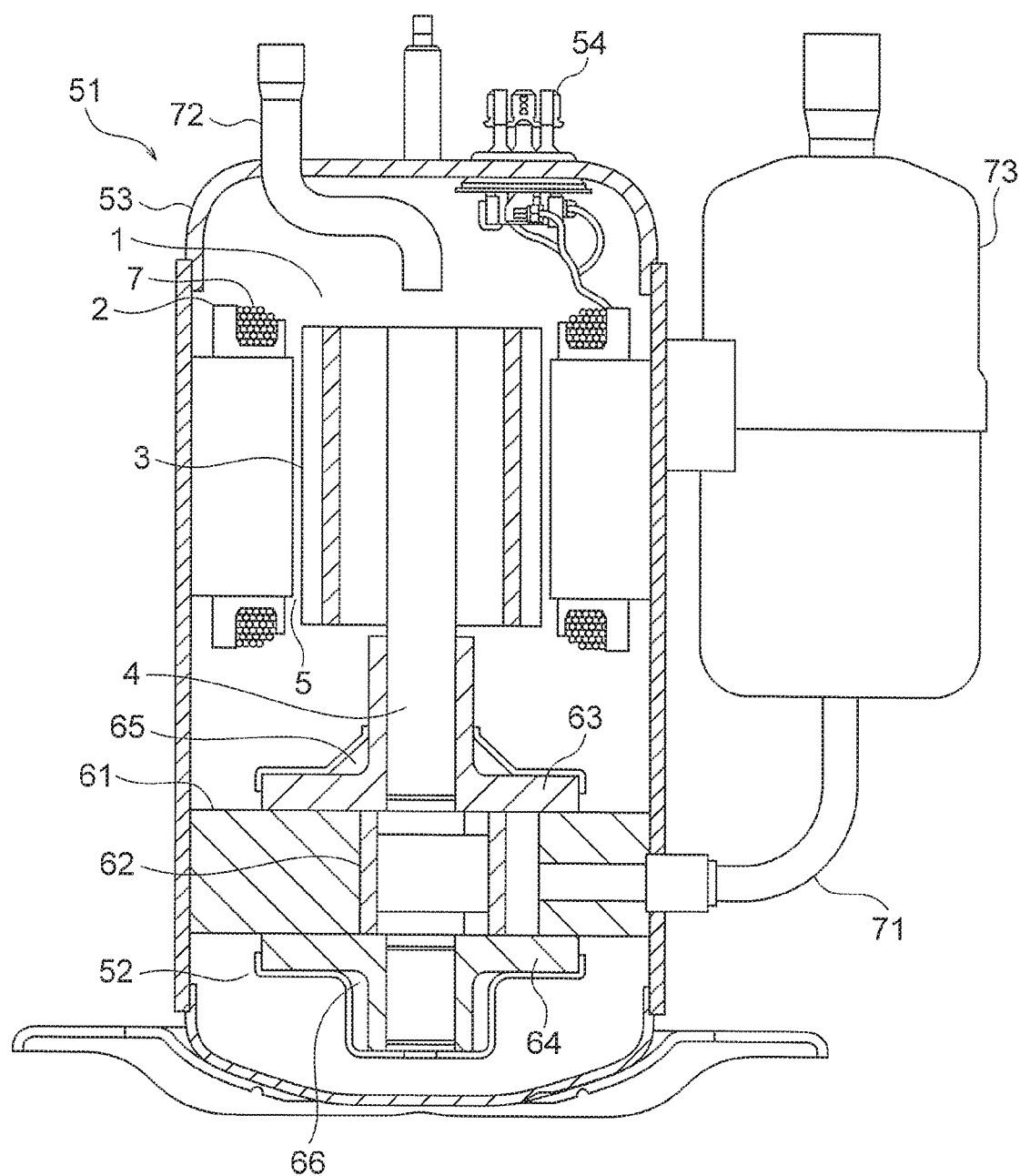
FIG. 6 is a longitudinal cross section that shows a compressor according to Embodiment 3 of the present invention.

FIG. 6 is a longitudinal cross section that shows a compressor according to Embodiment 3 of the present invention. A compressor 51 according to Embodiment 3 is a rotary compressor, but the type of the compressor 51 is not limited to a rotary compressor. The compressor 51 has: an electric motor 1 that has a similar or identical configuration to that of Embodiment 1; an inverter (not shown) that drives the electric motor 1 by pulse-width modulation (PWM) control; a compression portion 52 that is operated by a driving force from the electric motor 1; and a hermetically sealed vessel 53 that accommodates the electric motor 1 and the compression portion 52. A refrigerator oil that functions as a lubricating oil for the compression portion 52 is accumulated in a bottom portion of the hermetically sealed vessel 53.

The compression portion 52 is installed below the electric motor 1. The compression portion 52 has: a cylinder 61 that is fixed to an inner circumferential surface of the hermetically sealed vessel 53; a piston 62 that is disposed inside the cylinder 61; a vane (not shown) that divides the inside of the cylinder 61 into a suction chamber and a compression chamber; an upper portion frame 63 and a lower portion frame 64 (upper and lower pair) that close opening portions of upper and lower end surfaces of the cylinder 61; and an upper portion muffler 65 and a lower portion muffler 66 that are respectively disposed on the upper portion frame 63 and the lower portion frame 64.

The stator 2 of the electric motor 1 is directly fixed to an inner circumferential surface of the hermetically sealed vessel 53 by shrinkage fitting or welding, for example. The coils 7 of the stator 2 are electrically connected to glass terminals 54 that are disposed in an upper portion of the hermetically sealed vessel 53. Electric power from the inverter, which is installed outside the hermetically sealed vessel 53, is supplied to the coils 7 of the stator 2 through the glass terminals 54.

The rotating shaft 4 of the electric motor 1 passes vertically through the upper portion frame 63, the piston 62, and the lower portion frame 64 of the compression portion 52. The rotating shaft 4 is rotatably supported by the upper portion frame 63 and the lower portion frame 64, which function as bearings. The rotating shaft 4 is fixed to the piston 62 so as to be fitted into the piston 62. The piston 62 thereby rotates inside the cylinder 61 together with the rotating shaft 4 when the rotating shaft 4 rotates.

The rotor 3 of the electric motor 1 is disposed inside the stator 2 so as to have a gap 5 interposed. The rotor 3 is rotatably supported by the upper portion frame 63 and the lower portion frame 64 by means of the rotating shaft 4. The rotor 3 and the rotating shaft 4 rotate together relative to the stator 2 by supplying electric current from the inverter to the coils 7.

An inlet pipe 71 that constitutes refrigerant piping is fixed to a lower portion of the hermetically sealed vessel 53, and a discharge pipe 72 that constitutes refrigerant piping is fixed to an upper portion of the hermetically sealed vessel 53. An accumulator 73 in which a gas-liquid mixed refrigerant is separated into refrigerant gas and refrigerant liquid is installed outside the hermetically sealed vessel 53. The accumulator 73 is connected to the hermetically sealed vessel 53 by means of the inlet pipe 71. The refrigerant gas is supplied from the accumulator 73 through the inlet pipe 71 to the compression portion 52 inside the hermetically sealed vessel 53.

In the compression portion 52, the volumes of both the suction chamber and the compression chamber inside the cylinder 61 change together with the rotation of the piston 62, such that an operation of sucking in refrigerant gas, and an operation of compressing refrigerant gas that has been sucked in are performed simultaneously. High-temperature refrigerant gas that has been compressed by the compression portion 52 is discharged to the discharge pipe 72 from inside the hermetically sealed vessel 53.

Next, operation of the compressor 51 will be explained. When the rotating shaft 4 of the electric motor 1 rotates due to electric power being supplied to the coils 7 by PWM control of the inverter, the piston 62 of the compression portion 52 rotates inside the cylinder 61. When the piston 62 rotates, refrigerant gas is sucked from the accumulator 73 through the inlet pipe 71 into the cylinder 61.

The refrigerant gas that has been sucked into the cylinder 61 is compressed together with the rotation of the piston 62 to become high-temperature high-pressure refrigerant gas. The high-temperature refrigerant gas that has been compressed inside the cylinder 61 passes through the upper portion muffler 65 and the lower portion muffler 66, and then passes through gaps that exist in the electric motor 1 (such as the gap 5 between the stator 2 and the rotor 3, for example), and ascends inside the hermetically sealed vessel 53. After that, the refrigerant gas passes through the discharge pipe 72 and is supplied to a high-pressure side of a refrigeration cycle.

Moreover, conventionally available R-410A, R-4070, R-22, etc., can be used as the refrigerant of the compressor 51, but any refrigerant such as refrigerants that have low global warming potential (GWP) (hereinafter called "low- GWP refrigerants") can be applied. From the viewpoint of preventing global warming, low-GWP refrigerants are desired. The following refrigerants are representative of low-GWP refrigerants:

(1) halogenated hydrocarbons that have a carbon double bond in their composition:

HFO-1234yf ($CF_3CF=CH_2$), for example. HFO is an abbreviation of hydrofluoroolefin, olefins being unsaturated hydrocarbons that have one double bond. Moreover, the GWP of HFO-1234yf is 4.

(2) hydrocarbons that have a carbon double bond in their composition:

R-1270 (a propylene), for example. Moreover, the GWP thereof is 3, which is less than that of HFO-1234yf, but the flammability thereof is greater than that of HFO-1234yf.

(3) blends that contain at least one of a halogenated hydrocarbon that has a carbon double bond in its composition or a hydrocarbon that has a carbon double bond in its composition:

A blend of HFO-1234yf and R-32, for example. Pressure loss in HFO-1234yf is great since it is a low-pressure refrigerant, making performance of the refrigeration cycle more likely to deteriorate (particularly in an evaporator). Because of that, a blend with R-32 or R-41, which are higher-pressure refrigerants than HFO-1234yf, is effective for practical purposes.

Among the above low-GWP refrigerants, R-32 refrigerant is attracting particular attention since it is not toxic and is not highly flammable. The R-32 refrigerant has properties such that when R-32 refrigerant is used in the compressor 51 the internal temperature of the compressor 51 is increased by greater than or equal to approximately 20 degrees Celsius compared to R-410A, R-407C, and R-22, which are used conventionally.

The temperature in the compressor 51 differs depending on differences in compression loading states (differences in rotational speed, compression loading torque, and refrigerants, for example), and in a steady state of the compressor 51, is highly dependent on rotational speed in particular. For example, temperature increases inside the compressor 51 relative to rotational speed when R-410 refrigerant is used are 70 through 80 degrees Celsius during medium-speed operation, and 90 through 110 degrees Celsius during high-speed operation, compared to 50 through 60 degrees Celsius during low-speed operation. In other words, the temperature inside the compressor 51 when R-410 refrigerant is used exhibits properties that rise as the rotational speed of the compressor 51 increases. When R-32 refrigerant is used in the compressor 51, the temperature in the compressor 51 rises approximately a further 20 degrees Celsius compared to when R-410A refrigerant is used.

In a compressor 51 of this kind, because an electric motor 1 that has a similar or identical configuration to that of Embodiment 1 is used, demagnetization of the permanent magnets 10 of the electric motor 1 can be suppressed even if J coercivity of the permanent magnets 10 deteriorates due to temperature increases in the compressor 51. Thus, a highly reliable compressor 51 can be provided. Because demagnetization of the permanent magnets 10 can be suppressed while reducing the quantity of dysprosium added to the permanent magnets 10 in order to increase coercivity, torque reduction in the electric motor 1 can be suppressed by suppressing reductions in the residual magnetic flux density of the permanent magnets 10 while enabling reductions in costs for the compressor 51. Thus, a highly efficient compressor 51 can be provided. In addition, because the electric motor 1, in which vibrational forces in a radial direction of the rotor 3 are reduced due to the slits 23 in the rotor 3, is used in the compressor 51, vibration and noise in the compressor 51 can also be suppressed.

Because the compressor 51 has an inverter that drives the electric motor 1 by PWM control, rotational speed of the electric motor 1 can be easily adjusted without changing the voltage, and demagnetization of the permanent magnets 10 can also be suppressed even if the electric motor 1 is driven by PWM control, in which eddy currents are more likely to occur in the permanent magnets 10, enabling torque reduction in the electric motor 1 to be suppressed.

Moreover, in the above example, an electric motor 1 that has a similar or identical configuration to that of Embodiment 1 is used in the compressor 51, but an electric motor 1 that has a similar or identical configuration to that of Embodiment 2 may alternatively be applied to the compressor 51.

Embodiment 4

The present invention can also be implemented as a refrigeration and air conditioning apparatus that includes the compressor 51 according to Embodiment 3 above as a component of a refrigerating circuit. Components other than the compressor in the refrigerating circuit of the refrigeration and air conditioning apparatus are not limited to any particular configuration. For example, a refrigeration and air conditioning apparatus may be implemented that has a refrigerating circuit in which are coupled sequentially by means of refrigerant piping: the compressor 51 according to Embodiment 3 above; a condenser that condenses refrigerant that has been compressed by the compressor 51; a decompressing apparatus that decompresses refrigerant that has been condensed by the condenser; an evaporator that evaporates refrigerant that has been decompressed by the decompressing apparatus; and an accumulator that separates the refrigerant that has been evaporated by the evaporator into gas and liquid, and that conveys the refrigerant gas to the compressor 51, By using the above compressor 51 in the refrigeration and air conditioning apparatus in this manner, propagation of vibration through the piping is suppressed, enabling vibration and noise to be suppressed.

Finally, the contents of the present invention have been explained in detail with reference to preferred embodiments, but it is self-evident that various modified configurations can be adopted by any person skilled in the art based on the basic technical concepts and teachings of the present invention.

1 ELECTRIC MOTOR; 2 STATOR; 3 ROTOR; 9 ROTOR CORE; 10 PERMANENT MAGNET; 10a FIRST MAGNET; 10b SECOND MAGNET; 11 MAGNET ACCOMMODATING APERTURE; 12 FLUX BARRIER; 21 OUTER CIRCUMFERENTIAL CORE PORTION; 21a FIRST MAGNETIC PORTION; 21b SECOND MAGNETIC PORTION; 23 SLIT; 23a FIRST SLIT; 23b SECOND SLIT; 24 INTER-MAGNET SPACE PORTION (SPACE PORTION); 51 COMPRESSOR; 52 COMPRESSION PORTION.

The invention claimed is:
1. An electric motor comprising:
a stator; and
a rotor that is disposed radially inside the stator, and that is rotatable relative to the stator,
wherein
the rotor comprises:
a rotor core; and a plurality of permanent magnets that are disposed on the rotor core;

magnet accommodating apertures that are equal in number to a number of magnetic poles in the rotor are disposed on the rotor core so as to be spaced apart from each other in a circumferential direction of the rotor;

said each of the magnet accommodating apertures accommodates and shares a first magnet and a second magnet of the plurality of permanent magnets;

the first magnet and the second magnet accommodated in said each of the magnet accommodating apertures are disposed so as to be separated from each other in the circumferential direction of the rotor;

the rotor core comprises a plurality of outer circumferential core portions that respectively exist on a radially outer side of the magnet accommodating apertures;

each of the outer circumferential core portions of the magnet accommodating apertures includes a circumferentially intermediate portion accommodating a pair of first slits and a pair of second slits, the pair of first slits being disposed adjacent to each other in the circumferential direction of the rotor, and the pair of second slits being disposed adjacent to and circumferentially outside the pair of first slits;

the outer circumferential core portions each comprise:
a first magnetic portion that exists between the pair of first slits; and
a pair of second magnetic portions that respectively exist between the pair of first slits and the pair of second slits that are adjacent to each other;

an inter-magnet space portion that exists between the first magnet and the second magnet is positioned within a range of the first magnetic portion in the circumferential direction of the rotor; and said each of the magnet accommodating apertures has a magnetic pole center line and two circumferential end portions, and each of the magnet accommodating apertures when viewed along a shaft axis of the rotor has a V shape that protrudes in a radially inward direction of the rotor toward the magnetic pole center line from the two circumferential end portions.

2. The electric motor according to claim 1, wherein a dimension of the first magnetic portion in the circumferential direction of the rotor is greater than a dimension of the second magnetic portions in the circumferential direction of the rotor.

3. The electric motor according to claim 1, wherein within said each of the magnet accommodating apertures, the pair of first slits and the pair of second slits are inclined toward the magnetic pole center line in an outward radial direction of the rotor when viewed in an axial direction of the rotor.

4. The electric motor according to claim 1, wherein respective dimensions of the first magnet and the second magnet in the circumferential direction of the rotor are greater than a dimension of the first magnetic portion in the circumferential direction of the rotor.

5. The electric motor according to claim 1, wherein a dimension of the inter-magnet space portion in the circumferential direction of the rotor is smaller than respective width dimensions of the slits.

6. The electric motor according to claim 1, wherein respective sizes and shapes of the first magnet and the second magnet are identical.

7. A compressor comprising:
the electric motor according to claim 1;
an inverter that drives the electric motor by pulse-width modulation control; and
a compression portion that is operated by a driving force from the electric motor.

8. A refrigeration and air conditioning apparatus comprising the compressor according to claim 7.

* * * * *